US012549654B2

(12) United States Patent
Li et al.

(10) Patent No.: US 12,549,654 B2
(45) Date of Patent: Feb. 10, 2026

(54) DISPLAY MODULE AND FIXING METHOD THEREFOR, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Fan Li, Beijing (CN); Xiaolong Zhu, Beijing (CN); Hengzhen Liang, Beijing (CN); Xinpeng Wang, Beijing (CN); Wenxiao Niu, Beijing (CN); Bing Gong, Beijing (CN); Zhihui Yan, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 1022 days.

(21) Appl. No.: 17/629,559

(22) PCT Filed: Mar. 9, 2021

(86) PCT No.: PCT/CN2021/079698
§ 371 (c)(1),
(2) Date: Jan. 24, 2022

(87) PCT Pub. No.: WO2021/203893
PCT Pub. Date: Oct. 14, 2021

(65) Prior Publication Data
US 2022/0271263 A1    Aug. 25, 2022

(30) Foreign Application Priority Data

Apr. 9, 2020 (CN) .......................... 202010272448.4

(51) Int. Cl.
*H04M 1/02* (2006.01)
*H10K 59/65* (2023.01)
*H10K 59/80* (2023.01)

(52) U.S. Cl.
CPC ...... *H04M 1/0264* (2013.01); *H10K 59/8792* (2023.02); *H10K 59/65* (2023.02); *H10K 59/875* (2023.02)

(58) Field of Classification Search
CPC .. H04M 1/0264; H04M 1/0266; H10K 59/65; H10K 59/875; H10K 59/8792; G02B 6/0081
See application file for complete search history.

(56) References Cited

U.S. PATENT DOCUMENTS 10,534,221 B1 * 1/2020 Zhu .................. G02F 1/133602
2020/0064681 A1 * 2/2020 Son ...................... G06F 1/1643
(Continued)

FOREIGN PATENT DOCUMENTS

CN         107229148 A       10/2017
CN         109218475 A  *     1/2019  ............ H04M 1/026
(Continued)

*Primary Examiner* — Alexander K Garlen
(74) *Attorney, Agent, or Firm* — IPro, PLLC

(57) ABSTRACT

The present invention provides a display module and a fixing method therefor, and a display apparatus. The display module is provided with a light-shielding structure including a light-shielding part and a supporting part that are integrally formed, wherein the light-shielding part is arranged around the inner wall of a through hole; the supporting part is fixed to a side of a display panel away from a cover plate; and an orthographic projection of the light-shielding part on the cover plate and an orthographic projection of a light-shielding layer on the cover plate at least partially overlap, such that a transition area is surrounded by the light-shielding layer and the light-shielding part in a through hole area.

13 Claims, 4 Drawing Sheets

(56) References Cited

U.S. PATENT DOCUMENTS

2021/0333466 A1* 10/2021 Zhou .................... G02B 6/0055
2022/0026771 A1*  1/2022 Yan ...................... G02B 6/0088

FOREIGN PATENT DOCUMENTS

| CN | 110062082 A | | 7/2019 | |
| --- | --- | --- | --- | --- |
| CN | 110426895 A | | 11/2019 | |
| CN | 213904766 U | * | 8/2021 | ........... G02B 6/0051 |
| JP | 2003167241 A | | 6/2003 | |

* cited by examiner

Providing a light-shielding structure, wherein the light-shielding structure includes a light-shielding part and a supporting part that are integrally formed, and a face of the supporting part fixed to a display panel has a double-sided tape and a protective film located on an outer side of the double-sided tape — S701

Tearing off the protective film, dispose the light-shielding part around an inner wall of a through hole by using alignment equipment, and fixing the supporting part to a side of the display panel away from a cover plate by the double-sided tape — S702

Fig. 7

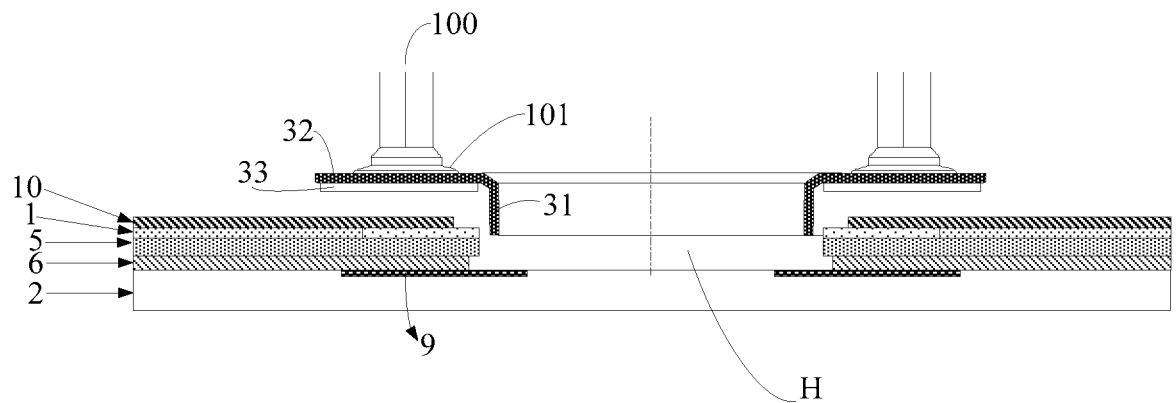

Fig. 8

DISPLAY MODULE AND FIXING METHOD THEREFOR, AND DISPLAY APPARATUS

CROSS REFERENCE TO RELATED APPLICATIONS

The present application is a National Stage of International Application No. PCT/CN2021/079698, filed on Mar. 9, 2021, which claims priority to Chinese Patent Application No. 202010272448.4, entitled "Display Module and Fixing Method Therefor, and Display Apparatus", and filed to the China Patent Office on Apr. 9, 2020, the entire contents of which are incorporated herein by reference.

FIELD

The present disclosure relates to the technical field of display, in particular to a display module and a fixing method therefor, and a display apparatus.

BACKGROUND

In order to achieve a higher screen-to-body ratio of a display panel, a through hole region may be disposed in a display region of the display panel, and further devices such as a camera may be disposed in the through hole region.

SUMMARY

An embodiment of the present disclosure provides a display module, including:
- a display panel, having a display region, a transition region and a through hole region, wherein the transition region is located between the display region and the through hole region; and the through hole region has a through hole penetrating through a thickness direction of the display panel;
- a cover plate, located on a light emitting side of the display panel;
- a light-shielding layer, located in the transition region and located on a side of the cover plate facing the display panel;
- a light-shielding structure, including a light-shielding part and a supporting part that are integrally formed, wherein the light-shielding part is disposed around an inner wall of the through hole, and the supporting part is fixed to a side of a back surface of the display panel away from the cover plate; and
- a camera, at least partially located in the through hole, wherein an orthographic projection of the light-shielding layer on the cover plate and an orthographic projection of the camera located in the through hole on the cover plate do not overlap, and an orthographic projection of the light-shielding part on the cover plate and the orthographic projection of the light-shielding layer on the cover plate at least partially overlap.

In some embodiments, the light-shielding part and the inner wall of the through hole are not in contact with each other.

In some embodiments, a distance between the light-shielding part and the inner wall of the through hole is 0.1 mm-0.25 mm.

In some embodiments, the light-shielding part and the light-shielding layer are not in contact with each other.

In some embodiments, a distance between the light-shielding part and the light-shielding layer is less than 0.1 mm.

In some embodiments, an interval between an edge adjacent to the through hole region, of the orthographic projections of the light-shielding part and an edge adjacent to the through hole region, of the orthographic projections of the light-shielding layer on the cover plate is 0.05 mm-0.2 mm.

In some embodiments, the supporting part is fixed to the side of the display panel away from the cover plate by a double-sided tape.

In some embodiments, an orthographic projection of the double-sided tape on the cover plate is located within a range of an orthographic projection of the supporting part on the cover plate.

In some embodiments, a distance between a side edge of the double-sided tape away from the through hole and a side edge of the supporting part away from the through hole is 0.2 mm-0.5 mm, and a distance between a side edge of the double-sided tape close to the through hole and the light-shielding part is 0.2 mm-0.5 mm.

In some embodiments, a material of the light-shielding structure is metal, and the light-shielding structure is formed by stamping.

In some embodiments, a material of the light-shielding structure is plastic, and the light-shielding structure is formed by injection molding.

In some embodiments, the above display module further includes: a touch panel located between the cover plate and the display panel, a polarizer located between the touch panel and the cover plate, a first adhesive layer and a second adhesive layer; wherein the touch panel and the display panel are bonded through the first adhesive layer, and the polarizer and the cover plate are bonded through the second adhesive layer.

Based on the same inventive concept, an embodiment of the present disclosure further provides a display apparatus, including the above display module.

Based on the same inventive concept, an embodiment of the present disclosure further provides a fixing method for the display module, including:
- providing a light-shielding structure, wherein the light-shielding structure includes a light-shielding part and a supporting part that are integrally formed, and a face of the supporting part fixed to a display panel has a double-sided tape and a protective film located on an outer side of the double-sided tape; and
- tearing off the protective film, disposing the light-shielding part around an inner wall of a through hole by using alignment equipment, and fixing the supporting part to a side of the display panel away from a cover plate by the double-sided tape.

In some embodiments, the disposing the light-shielding part around the inner wall of the through hole by using the alignment equipment, and fixing the supporting part to the side of the display panel away from the cover plate by the double-sided tape, includes:
- absorbing an edge region of the supporting part by a suction nozzle of the alignment equipment, installing, by the suction nozzle, the light-shielding part into the through hole, and pressing the supporting part by a pressure head of the alignment equipment so as to fix the supporting part to the side of the display panel away from the cover plate.

BRIEF DESCRIPTION OF THE DRAWINGS

FIG. 7 is a flowchart of a fixing method for a display module provided by an embodiment of the present disclosure.

FIG. 8 is a schematic structural diagram of an installation process of a display module provided by an embodiment of the present disclosure.

DETAILED DESCRIPTION OF THE EMBODIMENTS

Figure 1:
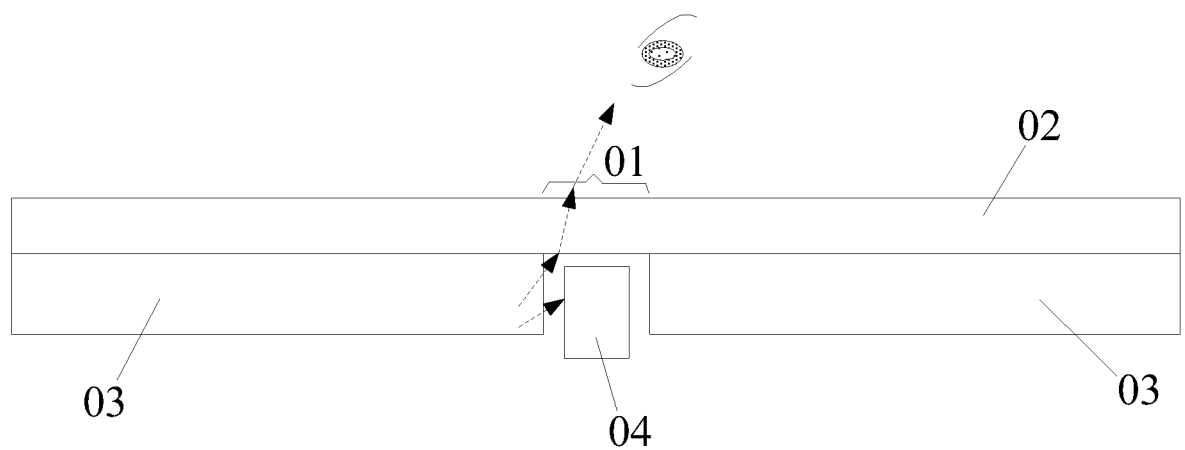
FIG. 1 is a schematic diagram of a sectional structure of a display panel in the related art.

In order to make the objectives, technical solutions, and advantages of embodiments of the present disclosure clearer, the technical solutions of embodiments of the present disclosure will be described clearly and completely with reference to the accompanying drawings of the embodiments of the present disclosure. Apparently, the described embodiments are some, but not all, embodiments of the present disclosure. Under the condition of no conflict, embodiments in the present disclosure and the features in embodiments can be combined with each other. Based on the described embodiments of the present disclosure, all other embodiments attainable by those ordinarily skilled in the art without involving any inventive effort are within the protection scope of the present disclosure.

Unless defined otherwise, technical terms or scientific terms used in the present disclosure shall have the ordinary meaning as understood by those ordinarily skilled in the art to which the present disclosure belongs. The "first", "second" and similar words used in the present disclosure do not indicate any order, quantity or importance, but are only used to distinguish different components. The word "include" or "comprise", and other similar words mean that a component or an article that precedes the word is inclusive of the component or article listed after the word and equivalents thereof, but does not exclude other components or articles. Similar words such as "connection" or "connected" are not limited to physical or mechanical connections, but may include electrical connections, whether direct or indirect. The terms "inner", "outer", "upper", "lower", and the like are used merely to denote a relative positional relationship that may change accordingly when the absolute position of an object being described changes.

It should be noted that dimensions and shapes of various figures in the drawings are not to truly scale and are intended to be merely illustrative of the present disclosure. The same or similar reference numerals refer to the same or similar components or components having the same or similar functions throughout.

At present, in order to achieve a higher screen-to-body ratio of a display panel, a through hole region may be disposed in a display region of the display panel, and further devices such as a camera may be disposed in the through hole region. As shown in FIG. 1, a through hole region 01 usually only retains a glass cover plate 02, and other films and structures in a display panel 03 need to be cut off, so that a camera 04 may be disposed in a through hole formed by cutting. However, in practical applications, when the display panel 03 displays a picture, light emitted from the display region will leak from the side of the through hole, resulting in stray light, not only can human eyes see the leaked light, but the leaked light causes adverse effects on the imaging quality of the camera 04.

Figure 2:
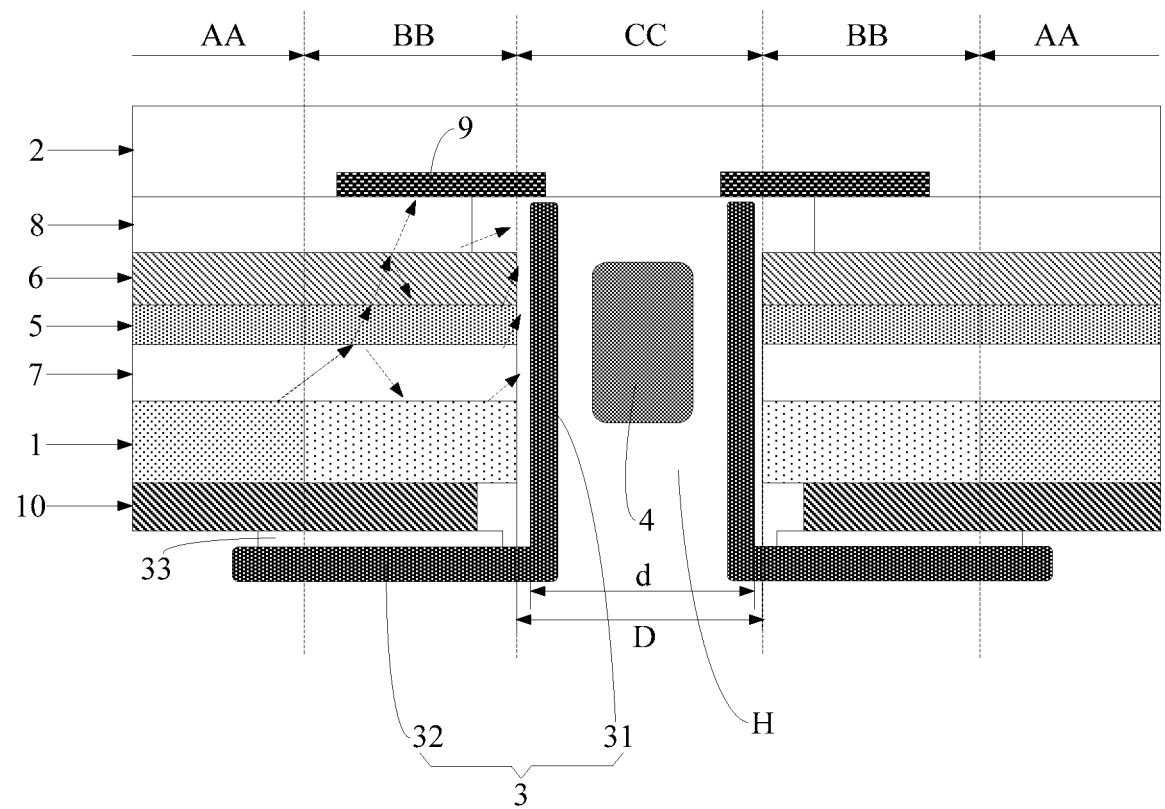
FIG. 2 is a schematic diagram of a sectional structure of a display module provided by an embodiment of the present disclosure.

An embodiment of the present discloses provides a display module, as shown in FIG. 2, including:

a display panel 1, having a display region AA, a transition region BB and a through hole region CC, where the transition region BB is located between the display region AA and the through hole region CC; and the through hole region CC has a through hole H penetrating through a thickness direction of the display panel 1;

a cover plate 2, located on a light emitting side of the display panel 1;

a light-shielding layer 9, located in the transition region BB and located on a side of the cover plate 2 facing the display panel 1;

a light-shielding structure 3, including a light-shielding part 31 and a supporting part 32 that are integrally formed, where the light-shielding part 31 is disposed around an inner wall of the through hole H, and the supporting part 32 is fixed to a side of the display panel 1 away from the cover plate 2; and a camera 4, at least partially located in the through hole H, where an orthographic projection of the light-shielding layer 9 on the cover plate 2 and an orthographic projection of the camera 4 located in the through hole H on the cover plate 2 do not overlap, and an orthographic projection of the light-shielding part 31 on the cover plate 2 and the orthographic projection of the light-shielding layer 9 on the cover plate 2 at least partially overlap. As shown in FIG. 2, only the cover plate 2 is retained in the through hole region CC, and the rest of the display panel 1 is cut off, so that the through hole H is obtained, and at least part (such as a photosensitive element) of the camera 4 is located in the through hole H. The display region AA of the display panel 1 may include a base substrate, a driving circuit structure, an OLED device and a packaging structure, and the driving circuit structure, the OLED device and the packaging structure are sequentially formed on the base substrate. The display module may further include: a touch panel 5 located between the cover plate 2 and the display panel 1, a polarizer 6 located between the touch panel 5 and the cover plate 2, a first adhesive layer 7 and a second adhesive layer 8; and the touch panel 5 and the display panel 1 are bonded through the first adhesive layer 7, the polarizer 6 and the cover plate 2 are bonded through the second adhesive layer 8, and parts of the touch panel 5, the polarizer 6, the first adhesive layer 7 and the second adhesive layer 8 in the corresponding through hole region CC are also cut off.

In some embodiments, as shown in FIG. 2, since the transition region BB is a region that is not displayed between the through hole region CC and the display region AA, in order to shield light of the display region AA from being emitted from the transition region BB, in the embodiment of the present disclosure, the light-shielding layer 9 located on a side of the cover plate 2 facing the display panel 1 is disposed in the transition zone BB, and a material of the light-shielding layer 9 is generally ink; in order to prevent the light-shielding layer 9 from blocking the light irradiated to the camera 4 and affecting the imaging quality of the camera 4, the orthographic projection of the light-shielding layer 9 on the cover plate 2 and the orthographic projection of the camera 4 located in the through hole H on the cover plate 2 do not overlap; and in addition, in order to prevent the light emitted from the display region AA of the display panel 1 from leaking from a side edge of the through hole H, the orthographic projection of the light-shielding part 31 on the cover plate 2 and the orthographic projection of the light-shielding layer 9 on the cover plate 2 at least partially overlap. In this way, the light-shielding layer 9 and the light-shielding part 31 surround the transition region BB in the through hole region CC, so that after the light emitted from the display region AA is reflected n (n=0, 1, 2, 3 . . . ) times in stacked layers (the first adhesive layer 7, the touch panel 5, the polarizer 6, the second adhesive layer 8, etc.), the light is reflected between side edges and the light-shielding part 31 multiple times rather than emitted from the side edges of the stacked layers or reflected between the side edges and the camera 4 multiple times, and the light is finally blocked by the light-shielding layer 9, does not enter human eyes, and is not irradiated to the camera 4, thereby avoiding the phenomenon of light leakage of the through hole region CC.

It should be noted that FIG. 2 only illustrates each structure in a display screen. In practical applications, depending on different types of display panels, other structures may also be included, which is not specifically limited in the embodiment of the present disclosure.

In specific implementation, the first adhesive layer and the second adhesive layer in the embodiment of the present disclosure may be optically clear adhesive (OCA), bonding strength of the OCA is relatively high, and the OCA has relatively high transparency and will not affect a display effect of the display panel.

In the above display module provided by embodiments of the present disclosure, a hole is dug in the display module so as to place at least part of the camera, so that the space occupied by the camera in the display region of the display module is reduced and a screen-to-body ratio of display equipment is improved. In addition, the display module of the present disclosure is provided with the light-shielding structure including the light-shielding part and the supporting part that are integrally formed, the light-shielding part is disposed around the inner wall of the through hole, the supporting part is fixed to the side of the display panel away from the cover plate, and the orthographic projection of the light-shielding part on the cover plate and the orthographic projection of the light-shielding layer on the cover plate at least partially overlap, so that the light-shielding layer and the light-shielding part surround the transition region in the through hole region, after the light emitted from the display region is reflected multiple times in the stacked layers, the light is reflected between the side edges and the light-shielding part multiple times rather than emitted from the side edges of the stacked layers or reflected between the side edges and the camera multiple times, and the light is finally blocked by the light-shielding layer, does not enter human eyes, and is not irradiated to the camera, thereby avoiding the phenomenon of light leakage of the through hole region CC and improving the imaging quality of the camera.

In some embodiments, the cover plate is a rigid plate with a certain strength and high transmittance, and the cover plate is configured to protect the display panel, a touch panel and other devices under the cover plate. In some embodiments, the cover plate may be a glass cover plate with high light transmittance and low cost, or a plastic cover plate.

In some embodiments, as shown in FIG. 2, a shape of the through hole H in the embodiment of the present disclosure is rectangular, and the transition region BB is a ring around the through hole region CC, but not limited to this, the shape of the through hole H may also be round, oval, U-shaped or other irregular shapes.

Figure 3:
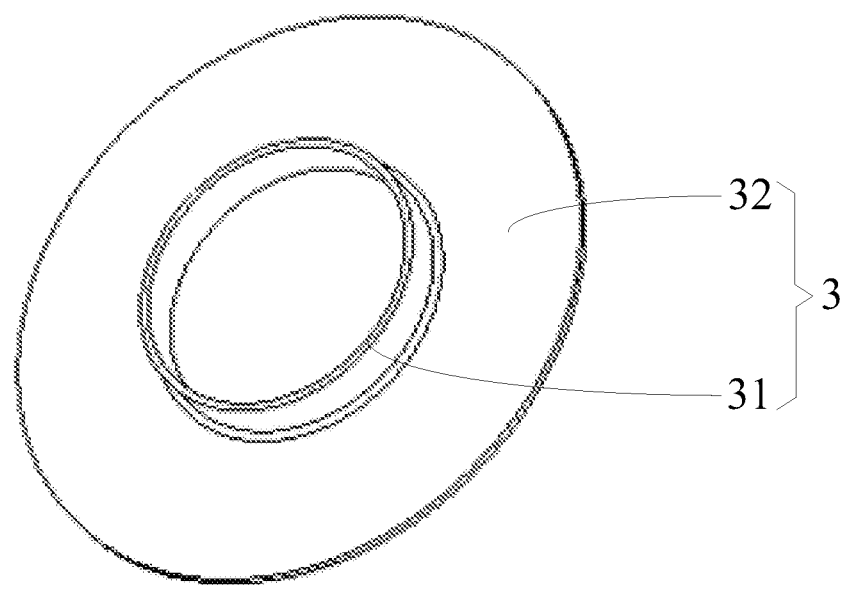
FIG. 3 is a schematic diagram of a three-dimensional structure of a light-shielding structure provided by an embodiment of the present disclosure.
Figure 4:
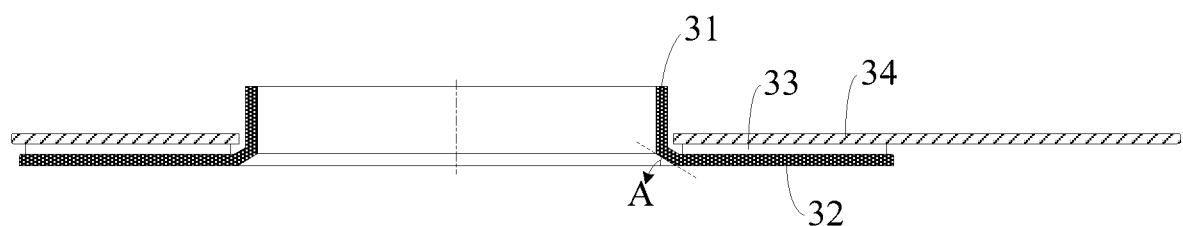
FIG. 4 is a schematic diagram of a cross-sectional structure of a light-shielding structure provided by an embodiment of the present disclosure.

In some embodiments, in the above display module, as shown in FIG. 3 and FIG. 4, FIG. 3 is a schematic diagram of a three-dimensional structure of the light-shielding structure 3, and FIG. 4 is a schematic diagram of a cross-sectional structure corresponding to FIG. 3. As shown in FIG. 3, the shape of the light-shielding structure 3 is a sleeve, which is similar in shape to a flange, the light-shielding part 31 of the sleeve is disposed around the inner wall of the through hole H, and at least part of the camera 4 is located in the sleeve (a containing space formed by the light-shielding part 31). As shown in FIG. 4, a face of the supporting part 32 in the light-shielding structure 3 of the present disclosure fixed to the display panel further includes a double-sided tape 33, and the supporting part 32 is fixed to the side of the display panel 1 away from the cover plate 2 by the double-sided tape 33. Before the light-shielding structure 3 is fixed to the display panel, the outer side of the double-sided tape 33 also includes a protective film 34. When the light-shielding structure 3 is fixed to the display panel, the protective film 34 of the double-sided tape 33 is first torn off, as shown in FIG. 5, FIG. 5 is a schematic top view of the light-shielding structure 3 in a sleeve shape (in FIG. 5, the light-shielding structure 3 is shown by a light-shielding sleeve 3), FIG. 5 shows an embodiment of the protective film 34, the protective film 34 has an annular part overlapping the double-sided tape 33, a part of the protective film 34 extending out of the sleeve is a film tearing handle 341 of the protective film 34 (referred to as the protective film tearing handle 341 in FIG. 5), in order to facilitate the tearing of the film, a cutting-off line 342 is also disposed in the annular protective film 34, so that the protective film 34 is peeled off from a side of the protective film tearing handle 341, and then the protective film 34 is torn off from a side of the cutting-off line 342 along the annular supporting part 32.

Figure 5:
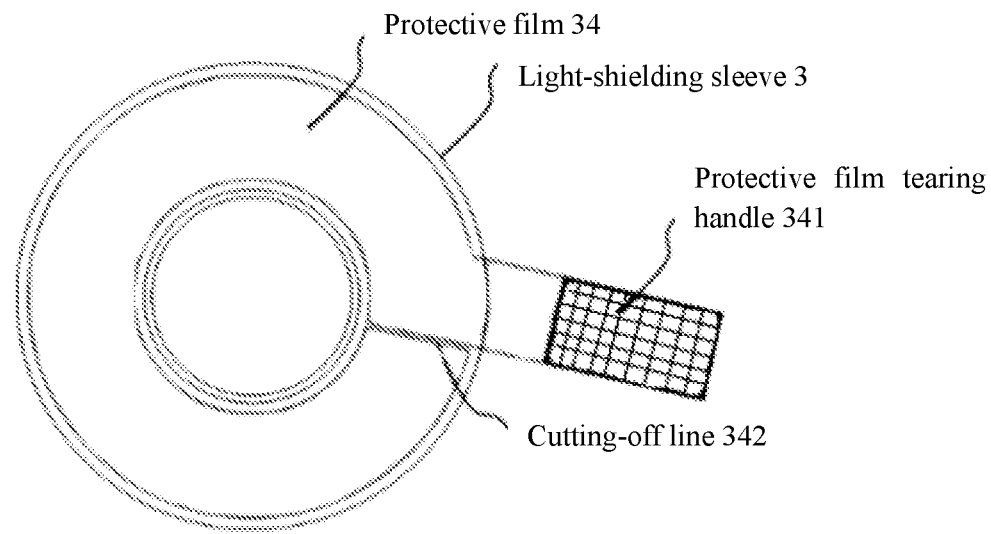
FIG. 5 is a schematic top view of a light-shielding structure provided by an embodiment of the present disclosure.

In some embodiments, the cutting-off line 342 in FIG. 5 is to facilitate the tearing off of the protective film 34. Of course, the cutting-off line is optional and not unique, which is not limited in the present disclosure.

In some embodiments, in order to manufacture the above display module, as shown in FIG. 4, a trapezoidal structure is adopted between the light-shielding part 31 and the supporting part 32 for integral forming in order to facilitate process forming when the light-shielding structure is manufactured, and an included angle A between a bottom surface of the trapezoidal structure and a horizontal plane is generally 45°. Of course, in the actual process, the included angle A has a certain deviation, and may be slightly greater than 45° or slightly less than 45°, which is not limited in the present disclosure.

In some embodiments, in order to conveniently install the light-shielding structure into the through hole, in the above display module, as shown in FIG. 2, the light-shielding part 31 and the inner wall of the through hole H are not in contact with each other, that is, a relationship between an outer diameter d of the sleeve-shaped light-shielding part 31 and an inner diameter D of the through hole H is: d<D, where a specific size of d is determined by a sleeve shape tolerance, a sleeve installation tolerance and a through hole tolerance. By reserving a certain distance between the light-shielding part 31 and the inner wall of the through hole H, when the sleeve-shaped light-shielding part 31 of the light-shielding structure is installed in the through hole H, it can be ensured that the light-shielding part 31 may be disposed around the inner wall of the through hole H.

In some embodiments, since the through hole is generally small, if the light-shielding part is far from the inner wall of the through hole, the space for placing the camera in the through hole will be small, which may result in insufficient space for placing the camera. In order to ensure that the light-shielding part is disposed around the inner wall of the through hole, and also ensure that there is enough space in the through hole to place the camera, in the above display module provided by the embodiment of the present disclosure, as shown in FIG. 2, a distance between the light-shielding part 31 and the inner wall of the through hole may be 0.1 mm-0.25 mm, that is, D−d=0.1 mm-0.25 mm. Of course, In some embodiments, the light-shielding part 31 may be in contact with the inner wall of the through hole H, but due to the influence of the actual process, during installation, if the light-shielding part 31 and the inner wall of the through hole H are disposed in contact with each other, the light-shielding structure 3 is difficult to install, and the preferred solution is that the distance between the light-shielding part 31 and the inner wall of the through hole His 0.1 mm-0.25 mm.

In some embodiments, since a thickness of the light-shielding layer is generally thin, in order to prevent the light-shielding part of the light-shielding structure from damaging the light-shielding layer when installed to the bottom of the through hole, in the above display module, as shown in FIG. 2, the light-shielding part 31 and the light-shielding layer 9 are not in contact with each other.

Figure 6:
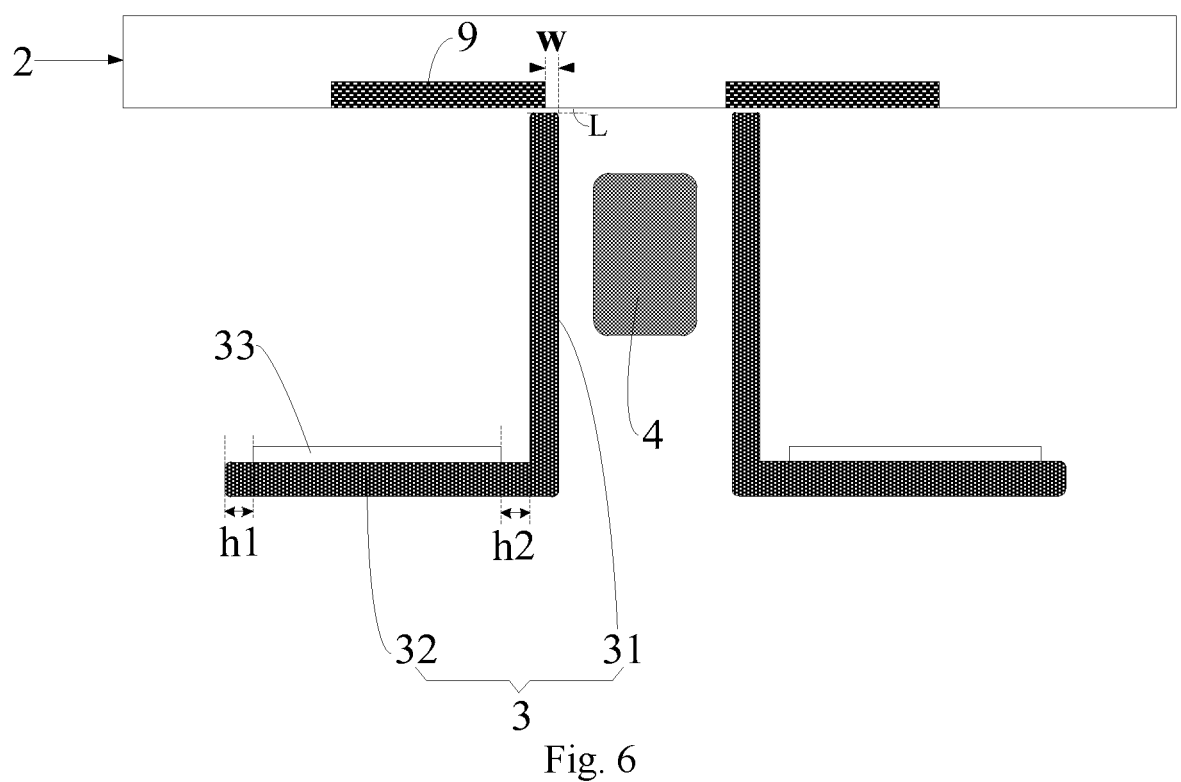
FIG. 6 is a schematic diagram of a sectional structure of part of a film layer of a display module provided by an embodiment of the present disclosure.

In some embodiments, since the light-shielding part and the light-shielding layer are not in contact with each other, that is, there is a certain distance between the light-shielding part and the light-shielding layer, if the distance is large, the light-shielding part and the light-shielding layer cannot be defined into an approximately-closed structure in the through hole region, resulting in that the light emitted from the display region is leaked from a gap between the light-shielding layer and the light-shielding part, that is, the setting of the light-shielding part cannot completely block the light in the display region, so in order to completely block the light of the display region from leaking from the through hole region, in the above display module, as shown in FIG. 6, FIG. 6 is a schematic structural diagram of part of a film layer in FIG. 2, and the distance L between the light-shielding part 31 and the light-shielding layer 9 is less than 0.1 mm.

In some embodiments, in the above display module, as shown in FIG. 6, an interval w between edges, adjacent to the through hole region CC, of the orthographic projections of the light-shielding part 31 and the light-shielding layer 9 on the cover plate 2 may be 0.05 mm to 0.2 mm. Of course, w is preferably 0, but in the actual process, it is difficult to achieve w to 0. In order not to affect the space for setting the camera 4 in the through hole region CC, a selection range of w is 0.05 mm to 0.2 mm.

In some embodiments, in the above display module, as shown in FIG. 2, the supporting part 31 is fixed to the side of the display panel 1 away from the cover plate 2 by the double-sided tape 33. In some embodiments, in the display module, the side of the display panel 1 away from the cover plate 2 is usually provided with a supporting heat dissipation structure 10, and the supporting part 31 is fixed to the supporting heat dissipation structure 10 by the double-sided tape 33. The sleeve-shaped light-shielding structure 3 provided by the embodiment of the present disclosure is fixed in contact with the supporting heat dissipation structure 10 of the display panel 1 through the double-sided tape 33, which can effectively avoid the problem of weak bonding.

In some embodiments, the double-sided tape should not be too large, or the double-sided tape remains on the outer side of the supporting part, which affects the appearance of the display module. Therefore, in the above display module, as shown in FIG. 2 and FIG. 6, an orthographic projection of the double-sided tape 33 on the cover plate 2 is located within a range of an orthographic projection of the supporting part 31 on the cover plate 2.

In some embodiments, considering factors such as the bonding tolerance of the double-sided tape, in the above display module, as shown in FIG. 6, a distance h1 between a side edge of the double-sided tape 33 away from the through hole H and a side edge of the supporting part 32 away from the through hole H may be 0.2 mm-0.5 mm, and a distance h2 between a side edge of the double-sided tape 33 close to the through hole H and the light-shielding part 31 may be 0.2 mm-0.5 mm.

In some embodiments, in the above display module, a material of the light-shielding structure 3 may be metal. When the light-shielding structure 3 is made of a metal material, the light-shielding structure 3 may be formed by stamping. In some embodiments, stamping forming refers to a processing and forming method of applying external force to plates, strips, pipes and profiles by means of a press and a mold to produce plastic deformation or separation, thereby obtaining workpieces (stamped parts) of a required shape and size.

In some embodiments, in the above display module, the material of the light-shielding structure 3 may also be plastic. When the light-shielding structure 3 is made of a plastic material, the light-shielding structure 3 may be formed by injection molding. The injection molding process refers to a process in which molten raw materials are pressurized, injected, cooled, and separated to produce semi-finished parts of a certain shape.

In some embodiments, the material of the light-shielding structure may also be other light-shielding materials with light-shielding properties, which is not specifically limited in the embodiment of the present disclosure.

In some embodiments, the material of the light-shielding structure may be a black material, of course, it may also be other dark-colored materials as long as the light-shielding part can achieve a better light-shielding effect under a certain thickness, which is not specifically limited in the embodiment of the present disclosure.

Based on the same inventive concept, an embodiment of the present disclosure provides a fixing method for a display module. Since the principle of the fixing method to solve the problems is similar to that of the above display module to solve the problems, the implementation of the fixing method provided by embodiments of the present disclosure may refer to the implementation of the above display module provided by embodiments of the present disclosure, and the repetition is not repeated here.

In some embodiments, the fixing method for the display module according to embodiments of the present disclosure, as shown in FIG. 7, includes the following steps:

S701, a light-shielding structure is provided, the light-shielding structure includes a light-shielding part and a supporting part that are integrally formed, and a face of the supporting part fixed to a display panel has a double-sided tape and a protective film located on an outer side of the double-sided tape; in some embodiments, as shown in FIG. 4, the light-shielding structure 3 includes the light-shielding part 31 and the supporting part 32 that are integrally formed, and the face of the supporting part 32 fixed to the display panel has the double-sided tape 33 and the protective film 34 located on the outer side of the double-sided tape; and S702, the protective film is torn off, the light-shielding part is disposed around an inner wall of a through hole by using alignment equipment, and the supporting part is fixed to a side of the display panel away from a cover plate by the double-sided tape; in some embodiments, as shown in FIG. 8, the protective film 34 is torn off, the light-shielding part 31 is disposed around the inner wall of the through hole H by using the alignment equipment 100, and the supporting part 32 is fixed to the side of the display panel 1 away from the cover plate 2 by the double-sided tape 33.

In the above fixing method for the display module provided by embodiments of the present disclosure, the light-shielding part of the light-shielding structure is disposed around the inner wall of the through hole through the alignment equipment, and the supporting part is fixed to the side of the display panel away from the cover plate, so that the light-shielding part blocks the light from a display region to a through hole region, the light emitted from the display region will not leak from a side edge of the through hole, not only will the human eyes not see leaked light, but also the light is prevented from generating interference to a process that a camera receives imaging light, and accordingly, the imaging quality of the camera is improved. In addition, by adoption of the sleeve-shaped light-shielding structure provided by embodiments of the present disclosure, effective installation can be achieved.

In some embodiments, in the above fixing method, the disposing the light-shielding part around the inner wall of the through hole by using the alignment equipment, and fixing the supporting part to the side of the display panel away from the cover plate by the double-sided tape, may specifically include:

as shown in FIG. 8, an edge region of the supporting part 32 is absorbed by a suction nozzle 101 of the alignment equipment 100, the suction nozzle 101 installs the light-shielding part 31 into the through hole H, and at the same time, the supporting part 32 is pressed by a pressure head (the pressure head and the suction nozzle 101 are integrated on one component, and installation and pressing-bonding are performed at the same time) of the alignment equipment 100 so as to fix the supporting part 32 to the side of the display panel 1 away from the cover plate 2.

In some embodiments, the present disclosure uses the sleeve-shaped light-shielding structure to shield the light emitted from the display region. During installation, only the alignment equipment is used to install the light-shielding part around the inner wall of the through hole into the through hole. In addition, the supporting part is fixed to the side of the display panel away from the cover plate by the double-sided tape, and an installation process is simple and feasible.

Based on the same inventive concept, an embodiment of the present disclosure further provides a display apparatus, including the above display module provided by embodiments of the present disclosure. Since the principle of the display apparatus to solve the problems is similar to that of the above display module, the implementation of the display apparatus may refer to the implementation of the above display module, and the repetition is not repeated here.

In some embodiments, the display apparatus may be any product or component with a display function, such as a mobile phone, a tablet computer, a television, a display, a notebook computer, a digital photo frame, a navigator, etc. Other indispensable components of the display apparatus are understood by those ordinarily skilled in the art, and will not be repeated here, nor should they be used as a limitation to the present disclosure.

According to the display module and the fixing method therefore, and the display apparatus provided by embodiments of the present disclosure, the hole is dug in the display module so as to place at least part of the camera, so that the space occupied by the camera in the display region of the display module is reduced and the screen-to-body ratio of the display equipment is improved. In addition, the display module of the present disclosure is provided with the light-shielding structure including the light-shielding part and the supporting part that are integrally formed, the light-shielding part is disposed around the inner wall of the through hole, the supporting part is fixed to the side of the display panel away from the cover plate, and the orthographic projection of the light-shielding part on the cover plate and the orthographic projection of the light-shielding layer on the cover plate at least partially overlap, so that the light-shielding layer and the light-shielding part surround the transition region in the through hole region, after the light emitted from the display region is reflected multiple times in the stacked layers, the light is reflected between the side edges and the light-shielding part multiple times rather than emitted from the side edges of the stacked layers or reflected between the side edges and the camera multiple times, and the light is finally blocked by the light-shielding layer, does not enter human eyes, and is not irradiated to the camera, thereby avoiding the phenomenon of light leakage of the through hole region and improving the imaging quality of the camera.

Although the preferred embodiments of the present disclosure have been described, additional variations and modifications may be made to these embodiments by those skilled in the art once the basic inventive concept is known. Therefore, it is intended that the appended claims be interpreted as including the preferred embodiments and all variations and modifications that fall within the scope of the present disclosure.

It will be apparent to those skilled in the art that various modifications and variations can be made in the embodiments of the present disclosure without departing from the spirit or scope of the embodiments of the present disclosure. Thus, if these modifications and variations of the embodiments of the present disclosure fall within the scope of the claims of the present disclosure and its equivalent technology, the present disclosure is also intended to include these modifications and variations.

What is claimed is:

1. A display module, comprising:
   a display panel comprising a display region, a transition region and a through hole region, wherein the transition region is located between the display region and the through hole region; and the through hole region has a through hole penetrating through a thickness direction of the display panel;
   a cover plate located on a light emitting side of the display panel;

a light-shielding layer located in the transition region and located on a side of the cover plate facing the display panel;

a light-shielding structure comprising a light-shielding part and a supporting part that are integrally formed, wherein the light-shielding part is disposed in the through hole, and the supporting part is fixed to a heat dissipation structure on a side of the display panel away from the cover plate, wherein an inner edge of the heat dissipation structure defines a portion of the inner wall of the through hole a camera at least partially located in the through hole, wherein an orthographic projection of the light-shielding layer on the cover plate and an orthographic projection of the camera located in the through hole on the cover plate do not overlap, and an orthographic projection of the light-shielding part on the cover plate and the orthographic projection of the light-shielding layer on the cover plate at least partially overlap;

wherein the light-shielding part is not in contact with either of the light-shielding layer and the inner wall of the through hole.

2. The display module according to claim 1, wherein a distance between the light-shielding part and the inner wall of the through hole is 0.1 mm-0.25 mm.

3. The display module according to claim 1, wherein a distance between the light-shielding part and the light-shielding layer is less than 0.1 mm.

4. The display module according to claim 1, wherein an interval between an edge, adjacent to the through hole region, of the orthographic projections of the light-shielding part and an edge, adjacent to the through hole region, of the orthographic projections of the light-shielding layer on the cover plate is 0.05 mm-0.2 mm.

5. The display module according to claim 1, wherein the supporting part is fixed to the side of the display panel away from the cover plate by a double-sided tape.

6. The display module according to claim 5, wherein an orthographic projection of the double-sided tape on the cover plate is located within a range of an orthographic projection of the supporting part on the cover plate.

7. The display module according to claim 6, wherein a distance between a side edge of the double-sided tape away from the through hole and a side edge of the supporting part away from the through hole is 0.2 mm-0.5 mm, and a distance between a side edge of the double-sided tape close to the through hole and the light-shielding part is 0.2 mm-0.5 mm.

8. The display module according to claim 1, wherein a material of the light-shielding structure is metal, and the light-shielding structure is formed by stamping.

9. The display module according to claim 1, wherein a material of the light-shielding structure is plastic, and the light-shielding structure is formed by injection molding.

10. The display module according to claim 1, further comprising: a touch panel located between the cover plate and the display panel, a polarizer located between the touch panel and the cover plate, a first adhesive layer and a second adhesive layer; wherein the touch panel and the display panel are bonded through the first adhesive layer, and the polarizer and the cover plate are bonded through the second adhesive layer.

11. A display apparatus, comprising the display module according to claim 1.

12. A fixing method for the display module according to claim 1, comprising:

providing a light-shielding structure, wherein the light-shielding structure comprises a light-shielding part and a supporting part that are integrally formed, and a surface of the supporting part fixed to a display panel comprises a double-sided tape and a protective film located on an outer side of the double-sided tape; and tearing off the protective film, disposing the light-shielding part around an inner wall of a through hole by using an alignment equipment, and fixing the supporting part to a side of the display panel away from a cover plate by the double-sided tape.

13. The fixing method according to claim 12, wherein the disposing the light-shielding part around the inner wall of the through hole by using the alignment equipment, and fixing the supporting part to the side of the display panel away from the cover plate by the double-sided tape, comprises:

absorbing an edge region of the supporting part by a suction nozzle of the alignment equipment, installing, by the suction nozzle, the light-shielding part into the through hole, and pressing the supporting part by a pressure head of the alignment equipment so as to fix the supporting part to the side of the display panel away from the cover plate.

* * * * *